Aug. 24, 1948.　　　　　E. R. BLOUT　　　　2,447,792
BIREFRINGENT SOLID FILM OF EVAPORATED
AND DEPOSITED ISOPHTHALIC ACID
Filed March 24, 1945

INVENTOR.
Elkan R. Blout
BY Donald L. Brown
Attorney

Patented Aug. 24, 1948

2,447,792

UNITED STATES PATENT OFFICE 2,447,792

BIREFRINGENT SOLID FILM OF EVAPORATED AND DEPOSITED ISOPHTHALIC ACID

Elkan R. Blout, Cambridge, Mass., assignor to Polaroid Corporation, Cambridge, Mass., a corporation of Delaware Application March 24, 1945, Serial No. 584,591

6 Claims. (Cl. 88—65)

1

This invention relates to optical elements, and more particularly to the production of birefringent optical elements and material.

It is one object of the present invention to provide new and improved birefringent optical elements of high birefringence, and particularly birefringence in excess of 0.30.

Another object is to provide such highly birefringent elements having the optical properties of a basal section of a uniaxial crystal, and being optically isotropic for normally incident light but birefringent for obliquely incident light.

A further object is to provide optical elements of the above type in the form of a solid film comprising isophthalic acid, and particularly to provide such birefringent optical elements by the high vacuum evaporation and deposition of isophthalic acid.

Figure 1:
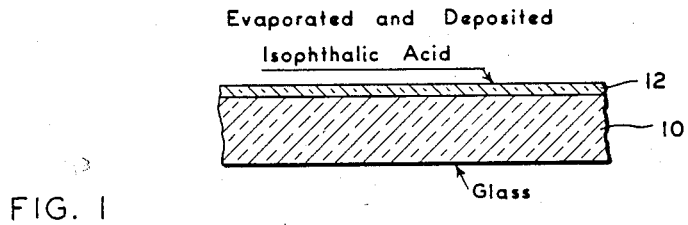
Figure 2:
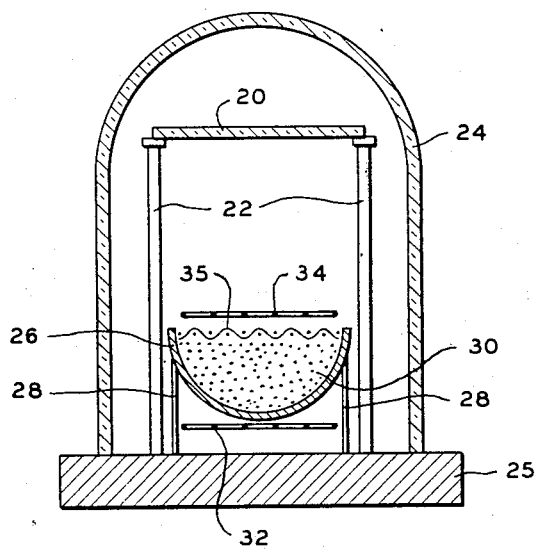

Still further objects and advantages will in part appear and in part be pointed out in the course of the following detailed description of one or more embodiments of the invention, which are given as nonlimiting examples, in connection with the accompanying drawings, in which:

Figure 1 is a sectional view illustrating diagrammatically an embodiment of the invention; and Figure 2 is a sectional view illustrating diagrammatically apparatus suitable for producing the embodiments of the invention shown in Fig. 1.

The embodiment of the invention shown in Fig. 1 comprises a supporting plate 10 of glass or other suitable material having a film 12 formed thereon by the evaporation and deposition of isophthalic acid under high vacuum. In accordance with the present invention, it has been discovered that such a film will possess the optical properties of a basal section of an extremely highly birefringent crystal, being optically isotropic for light normally incident thereon but exhibiting high birefringence for obliquely incident light up to a maximum of more than 0.30. Fig. 2 illustrates apparatus suitable for use in the preparation of a device such as that shown in Fig. 1.

Plate 20 in Fig. 2 corresponds to element 10 in Fig. 1 and is illustrated as mounted on any suitable supports 22 within bell jar 24, mounted on any suitable base plate 25. It will be understood that any suitable means, not shown, may be provided for evacuating bell jar 24, and maintaining the desired high vacuum therein during the evaporation process. Crucible 26 may be formed from a non-heat-conducting material such as porcelain or a heat-conducting metal such as stainless steel or nickel, in which case it may

2 be insulated from base plate 25 in any suitable manner, as for example by means of legs 28 of porcelain or other relatively non-heat-conducting material. The charge 30 of material to be evaporated is placed within crucible 26 and heat applied thereto by means of filaments 32 and 34 of any suitable metal and shape, a spiral shape having been found desirable. Filaments 32 and 34 may be supported in any way as by means of the lead wires thereto, not shown, and element 35 represents a relatively fine wire screen, the purpose of which will be described hereinafter.

In practicing the invention with the apparatus shown in Fig. 2, it is important that the vacuum within bell jar 24 be as high as possible and be maintained high throughout the evaporation process. Two factors contribute to this requirement. The first is that in the practice of the present invention there is at least a slight tendency to decomposition of the charge at the temperature of evaporation, and this tendency increases with temperature. At the same time, any decomposition results in a lowering of the vacuum, which in turn raises the temperature necessary for evaporation and hence encourages more rapid decomposition, and these effects are cumulative unless any decomposition products are removed as rapidly as they form. The other factor is related to the same problem and is that organic molecules generally tend to hold a substantial amount of entrapped air or gas which will be released during evaporation and will thereby similarly reduce the vacuum and encourage decomposition. A vacuum as high as $10^{-6}$ mm. of mercury is desirable and for preferred results it should not be permitted to drop below $10^{-4}$ mm. of mercury.

In practicing the invention it is highly desirable that heat be applied substantially uniformly, and for preferred results the entire charge should be heated to the evaporation point before any vaporization begins. It appears that optimum results from the standpoint of uniformity and clarity are obtained when the charge vaporizes and deposits on plate 20 in units as small as possible, i. e., molecules or groups of a very small number of associated molecules. When the vaporization is not uniform there is a tendency for the vaporizing material to carry up with it particles of substantially greater than molecular size, and they in turn tend to cause loss of clarity and uniformity in the deposited coating. After evaporation begins, the control of heat is somewhat a matter of balance between maintaining the evaporation both rapid and uniform and holding decomposition to a minimum. In the evaporation of isophthalic acid preferred results have been obtained at a temperature of 285 to 290° C. and at higher temperatures decomposition increases until it becomes a serious problem. In general, however, it may be stated that satisfactory results will be obtained with temperatures ranging upwards from the point at which evaporation begins by as much as 35° C.

Control of the conditions of evaporation within the desired range may be aided in a variety of ways. For example, the use of a heat-conducting crucible and the two filaments 32 and 34 in Fig. 2 aids in producing uniformly rapid heating of the charge. Screen 35 is of assistance in trapping particles of sizes such that they might affect the quality of the deposited film and is, therefore, preferably of relatively fine mesh. For example, a 200-mesh screen of bronze or stainless steel wire has been found satisfactory. Other factors affecting uniformity are the distance and angular relation between plate 20 and crucible 26, which are dependent upon a number of variables. It is desirable to prevent the temperature of the plate from rising too high, approximately 60 to 65° C. being the preferred upper limit, and the plate should therefore not be placed too near the crucible, from 3½ to 4 inches being a preferred minimum distance. It is also preferred that the vaporized particles from the crucible deposit on the plate at as nearly normal incidence as possible, and the relative positions of the plate and crucible should be determined accordingly. For example, if the plate is positioned directly over the crucible as in Fig. 2, its lower surface should be substantially parallel with the top of the crucible and at a distance therefrom which is determined to a considerable extent by their relative sizes. The rate of deposition on any point on the plate is approximately inversely proportional to the square of the distance between said point and the crucible. It follows that the distance between plate and crucible should be correspondingly increased for plates of substantially greater area than the top of the crucible in order that the rate of deposition be as nearly uniform as possible over the entire surface of the plate. If there is a material departure from these conditions, the deposited film may be of non-uniform thickness or the optic axis therein may be non-uniformly disposed, or both of these effects may occur. The thickness of the deposited film depends upon the time of evaporation and the distance between the crucible and supporting plate, and it may be readily controlled either visually, if a transparent bell jar is used, or by means of any suitable measuring and control device such as a photoelectric measuring device. As a specific example, a film of isophthalic acid having a thickness of the order of ten wavelengths may be deposited in as little time as fifteen minutes from the time when heat is first applied to the charge.

When the foregoing conditions are observed there will be formed on plate 20 an optically clear and glassy appearing film possessing the optical properties of a basal section of a highly birefringent uniaxial crystal. That is to say, said film will be optically isotropic for light normally incident thereon but will exhibit high birefringence for obliquely incident light, the maximum value being observed in a cross section wherein the respective refractive indices have been measured as approximately 1.40 and between 1.70 and 1.80. Examination by X-ray diffraction of the films of the invention reveals a pattern characteristic of a fibrous structure with the fiber axis perpendicular to the plane of the film, and the conclusion is that the film is composed of a multiplicity of microcrystals which adhere to the plate and cohere together to form an integral film in which all said microcrystals are oriented parallel to a common direction which is perpendicular to the plane of said film. It is of particular significance that said film is uniaxial in spite of the fact that isophthalic acid normally occurs in the form of biaxial crystals.

The above-described films of the invention are quite hard but relatively brittle. For that reason and also because they adhere thereto quite strongly, they are preferably retained in use on the supporting plate whereon they are initially formed. It should be noted, however, that the invention is not limited to said films in combination with a support or to the use of glass in said support. Any of a variety of other materials may be used, such for example as methyl methacrylate and other similar organic resins. It is desirable that the support used in the preparation of the film be substantially rigid, since otherwise it may bend under the conditions of evaporation. A convenient method of obtaining one of the films of the invention free from any support is to deposit said film on a support of water soluble material, such for example as rock salt, and then to dissolve the latter away after the film has been formed. All such variations are to be understood as coming within the scope of the invention.

Since certain changes may be made in the above product and different embodiments of the invention could be made without departing from the scope thereof, it is intended that all matter contained in the above description or shown in the accompanying drawings shall be interpreted as illustrative and not in a limiting sense.

What is claimed is:

1. As a new product, a light-transmitting, solid film comprising isophthalic acid, the molecules of which form planar, optically anisotropic groupings and are oriented in substantial planar parallelism with the surfaces of the film, whereby the film is optically isotropic for light normally incident thereon and birefringent for light obliquely incident thereon, the optic axis of said film being disposed perpendicularly to the film surface.

2. As a new product, an optical element comprising, in combination, means providing a supporting surface, and a substantially uniform solid film adhering to said surface and comprising isophthalic acid, the molecules of which are in the form of substantially planar, optically anisotropic groupings and are oriented in substantial planar parallelism with the surfaces of the film, whereby the film is optically isotropic for light normally incident thereon and birefringent for light obliquely incident thereon, the optic axis of said film being disposed perpendicularly to the film surface.

3. As a new product, a light-transmitting, solid film comprising isophthalic acid, the molecules of which form planar, optically anisotropic groupings and are oriented in substantial planar parallelism with the surfaces of the film, whereby the film is optically isotropic for light normally incident thereon and birefringent for light obliquely incident thereon, the optic axis of said film being disposed perpendicularly to the film surface, said film having an X-ray diffraction pattern characteristic of a fibrous structure with the fiber axis perpendicular to the plane of said film.

4. As a new product, an optical element comprising, in combination, means providing a supporting surface, and a substantially uniform solid film adhering to said surface and comprising isophthalic acid, the molecules of which are in the form of substantially planar, optically anisotropic groupings and are oriented in substantial planar parallelism with the surfaces of the film, whereby the film is optically isotropic for light normally incident thereon and birefringent for light obliquely incident thereon, the optic axis of said film being disposed perpendicularly to the film surface, said film having an X-ray diffraction pattern characteristic of a fibrous structure with the fiber axis perpendicular to the plane of the film.

5. In a process of forming a birefringent element, the steps comprising evaporating isophthalic acid by heating to a temperature of 285° to 290° C., and causing the resulting vapor to deposit on a supporting surface maintained approximately at a temperature of 60° to 65° C. and so positioned that the vaporized particles impinge thereon in a direction substantially normal to said surface, said steps being carried out in a vacuum.

6. In a process of forming a birefringent element, the steps comprising applying heat substantially uniformly throughout a mass of organic material comprising isophthalic acid until said mass begins to vaporize, and depositing said vaporized isophthalic acid upon the surface of a supporting plate positioned above said heated mass and spaced therefrom while maintaining the temperature of said supporting plate below 65° C., said plate being so positioned that the particles of said vaporized acid impinge thereon in a direction substantially normal to the surface of said plate, all of said steps being carried out in a vacuum.

ELKAN R. BLOUT.

REFERENCES CITED

The following references are of record in the file of this patent:

UNITED STATES PATENTS

| Number | Name | Date |
|---|---|---|
| 2,087,795 | Chubb | Jan. 20, 1937 |
| 2,270,323 | Land et al. | Jan. 20, 1942 |
| 2,328,219 | Land | Aug. 31, 1943 |

OTHER REFERENCES

McNally et al., article in Journal of Physical Chemistry, Vol. 34, January, June 1930, pages 165, 167, 168, 169. (Copy in Div. 7.)

Hackh's Chemical Dictionary, 3rd edition 1944, page 836, column 2. (Copy in Division 7.)

Hendricks in J. O. S. A., vol. 23, 1933, pages 299–307. (Copy in Division 7.)